(12) United States Patent
Lewis et al.

(10) Patent No.: US 9,348,496 B2
(45) Date of Patent: May 24, 2016

(54) SELECTING CONTENT BASED ON PERFORMANCE OF A CONTENT SLOT

(71) Applicant: Google Inc., Mountain View, CA (US)

(72) Inventors: Justin Lewis, Marina del Rey, CA (US); Jonathan W. Ray, Venice, CA (US)

(73) Assignee: Google Inc., Mountain View, CA (US)

( * ) Notice: Subject to any disclaimer, the term of this patent is extended or adjusted under 35 U.S.C. 154(b) by 201 days.

(21) Appl. No.: 13/931,665

(22) Filed: Jun. 28, 2013

(65) Prior Publication Data

US 2015/0007101 A1    Jan. 1, 2015

(51) Int. Cl.
*G06F 3/0485* (2013.01)

(52) U.S. Cl.
CPC ..................... *G06F 3/0485* (2013.01)

(58) Field of Classification Search
CPC .............. G06F 3/0485; G06F 3/04883; G06F 3/04855; G06F 3/03543; G06F 3/0362; G06F 3/038; G06F 3/0481; G06F 1/1626; G06F 1/169; G06F 3/0312; G06F 3/03546; G06F 3/04845; G06F 17/30861; G06F 2203/04806; G06F 3/00; G06F 17/3089; G06F 17/30

See application file for complete search history.

(56) References Cited

U.S. PATENT DOCUMENTS

| | | | |
|---|---|---|---|
| 5,896,132 A | 4/1999 | Berstis et al. | |
| 6,721,953 B1 | 4/2004 | Bates et al. | |
| 8,423,901 B2 | 4/2013 | D'Entremont et al. | |
| 8,656,312 B2 | 2/2014 | Kagaya et al. | |
| 8,676,891 B2 | 3/2014 | Su et al. | |
| 2003/0169280 A1* | 9/2003 | Hsieh | G06F 3/0485 345/684 |
| 2004/0207648 A1* | 10/2004 | Cox | G06F 3/0485 345/684 |
| 2005/0131762 A1* | 6/2005 | Bharat | G06Q 10/00 705/14.66 |
| 2005/0203796 A1* | 9/2005 | Anand | G06Q 30/0243 705/14.42 |
| 2006/0242017 A1* | 10/2006 | Libes | G06F 17/30864 705/14.54 |
| 2007/0209017 A1* | 9/2007 | Gupta | G06F 3/0485 715/781 |
| 2008/0155461 A1 | 6/2008 | Ozaki | |
| 2008/0243601 A1* | 10/2008 | Patel | G06Q 30/02 705/14.71 |

(Continued)

FOREIGN PATENT DOCUMENTS

KR    10-2007-0115348    12/2007

OTHER PUBLICATIONS

International Search Report and Written Opinion in International Application No. PCT/US2014/043222, 13 pages.

*Primary Examiner* — William Bashore
*Assistant Examiner* — Rayeez Chowdhury
(74) *Attorney, Agent, or Firm* — Foley & Lardner LLP; John D. Lanza

(57) ABSTRACT

In one aspect, a method includes receiving a request for content to be presented in a specified content slot of a specified content page; calculating an active view scroll distance of the specified content slot with respect to the specified content page, the active view scroll distance corresponding to a measurement of a distance that the specified content page would have to be scrolled to change visibility of content displayed in the specified content slot by a specified amount; performing an auction of content items utilizing in part the active view scroll distance; and providing one or more content items in response to the request and as a result of the auction.

19 Claims, 4 Drawing Sheets

(56) References Cited

U.S. PATENT DOCUMENTS

| | | | |
|---|---|---|---|
| 2010/0251153 A1* | 9/2010 | SanGiovanni | G06F 3/04817 715/767 |
| 2011/0007096 A1 | 1/2011 | Miyano | |
| 2011/0191168 A1 | 8/2011 | Schroedl et al. | |
| 2011/0225487 A1* | 9/2011 | Harris | G06F 17/3089 715/235 |
| 2011/0288913 A1 | 11/2011 | Waylonis et al. | |
| 2012/0022926 A1 | 1/2012 | Ramanathan | |
| 2013/0144722 A1 | 6/2013 | Ramer et al. | |
| 2013/0185164 A1* | 7/2013 | Pottjegort | G06Q 30/02 705/14.73 |
| 2013/0212460 A1* | 8/2013 | Balasubramanian | G06Q 30/0242 715/234 |
| 2013/0325585 A1* | 12/2013 | Amit | G06Q 30/0241 705/14.41 |

* cited by examiner

SELECTING CONTENT BASED ON PERFORMANCE OF A CONTENT SLOT

BACKGROUND

This specification relates to the selection of content items.

Information, such as text, images, and videos, may be displayed in a window of a display screen. In some cases, all of the relevant information is visible in the window. In other cases, however, only a portion of the relevant information is visible in the window. For example, only a portion of the information may be visible in the window when the viewable size of the window is too small to display all of the information in a manner that can be easily viewed and manipulated by a user. To view a portion of the information that is not visible, the window may be scrolled to bring the information into view. Scrolling is the act of sliding the information vertically or horizontally relative to the window. Scrolling does not change the layout of the information, but moves (e.g., pans) a user's view across the information by bringing different portions of the information into the viewing area of the window. A user may scroll the information using touchscreen gestures, mouse movements, or keyboard presses.

Information that is presently visible in a window (i.e., without the need for scrolling to be viewed) may be referred to as above-the-fold (ATF) information. Information that can be viewed only by scrolling the information in the window may be referred to as below-the-fold (BTF) information. Providers of content may present certain information, for example, information that is high in rank, priority, relevance, significance, or importance, above the fold since ATF information is visibly prominent without the need for scrolling. For example, advertisers may prefer to present advertisements in the area that is above the fold because such advertisements would be visible to a user without scrolling.

SUMMARY

This specification describes technologies relating to selecting content for display in a content slot of a content page based on a predicted performance of the content slot. The performance is predicted based on an active view scroll distance of the content slot with respect to the content page. The active view scroll distance corresponds to a number of pixels that the content page would have to be scrolled downward to change visibility of content displayed in the content slot from substantially entirely visible to less than entirely visible.

In general, one innovative aspect of the subject matter described in this specification can be implemented in methods that may include receiving a request for content to be presented in a specified content slot of a specified content page; calculating an active view scroll distance of the specified content slot with respect to the specified content page, the active view scroll distance corresponding to a measurement of a distance that the specified content page would have to be scrolled to change visibility of content displayed in the specified content slot by a specified amount; performing an auction of content items utilizing in part the active view scroll distance; and providing one or more content items in response to the request and as a result of the auction.

These and other implementations can optionally include one or more of the following features. Performing the auction may include predicting performance of the content items based on at least the calculated active view scroll distance. Performing the auction may include providing the active view scroll distance to content item providers. Performing the auction may include determining eligibility of content items for the auction based on at least the calculated active view scroll distance. Performing the auction may include predicting performance of the specified content slot based on at least the calculated active view scroll distance. The method may include selecting a content item that has been previously designated for display in a content slot having a performance corresponding to the predicted performance. The active view scroll distance corresponds to a number of pixels that the specified content page would have to be scrolled downward to change visibility of content displayed in the specified content slot by a specified amount. The specified amount may correspond to a change of the visibility of the content from 100% visible to less than 80% visible. Calculating an active view scroll distance of the specified content slot with respect to the specified content page comprises: calculating the active view scroll distance based on at least one of a location of the specified content slot on the specified content page, dimensions of the specified content slot, dimensions of the specified content page, or dimensions and zoom level of a viewing area of a browser window displaying the specified content page, wherein the location of the specified content slot on the specified content page comprises either (i) a location of the specified content slot relative to locations of other content on the specified content page, or (ii) an absolute location of the specified content slot on the specified content page. Predicting performance of the specified content slot based on the calculated active view scroll distance comprises at least one of: predicting the performance of the specified content slot based on performance statistics associated with active view scroll distances stored in a lookup table; or predicting the performance using a machine learning algorithm having input parameters that include at least one of the calculated active view scroll distance, a location of the specified content slot on the specified content page, dimensions of the specified content slot, dimensions of the specified content page, dimensions and zoom level of a viewing area of a browser window displaying the specified content page, or an average scroll speed associated with the specified content page. Predicting performance of the specified content slot based on the calculated active view scroll distance comprises at least one of: predicting a click-through rate of the specified content slot based on the calculated active view scroll distance; predicting a probability that content displayed in the specified content slot will be viewed by a user based on the calculated active view scroll distance; or predicting an amount of time that content displayed in the specified content slot will remain visible in a viewing area of a browser window as a user scrolls through the specified content page. The method further includes receiving feedback information specifying at least one of whether the selected content item was viewed, an amount of time the selected content item was viewed, or an amount of the selected content item that was viewed. The method further includes measuring a quality of the selected content item based on the predicted performance of the specified content slot in which the selected content item is displayed. The selected content item comprises an advertisement, an image, a video, a prioritized feed item, or a search result item.

Particular implementations of the subject matter described in this specification may be implemented to realize one or more of the following potential advantages. Performance of a content slot may correspond to prominence and performance of a content item displayed in the content slot. For example, performance of a content slot may be used to predict click-throughs of content items and purchases associated with displayed content items. Performance of a content slot may be used as a criterion for selecting a content item to display in the content slot. Performance of a content slot may be used to measure performance and quality of a content item displayed in the content slot by, for example, understanding the context in which the content item is displayed. Performance of a content slot may improve targeting of viewable CPM (cost per mille) content where a content provider bids per viewable impression. Active view scroll distance or performance of a content slot may be provided as a targeting feature for content providers who prefer to present their content in a content slot with a desired performance level. Providing active view scroll distance and performance data associated with a content slot may enable content providers to more accurately bid for presentation of content and optimize their campaigns.

Details of one or more implementations of the subject matter described in this specification are set forth in the accompanying drawings and description below. Other features, aspects, and potential advantages of the subject matter will become apparent from the description, the drawings, and the claims.

DETAILED DESCRIPTION

Figure 1:
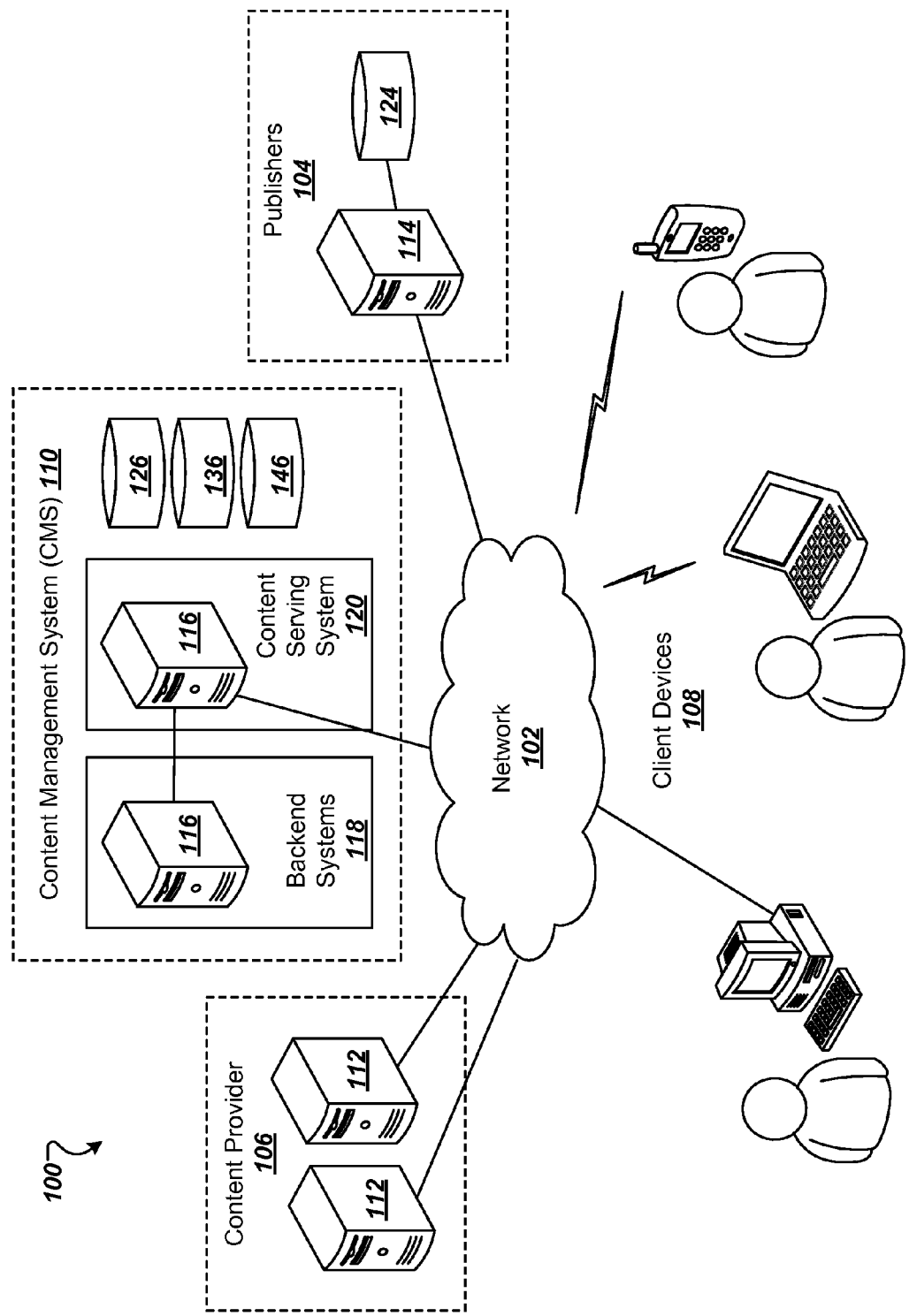
FIG. 1 is a block diagram of an example environment for distributing content.

FIG. 1 is a block diagram of an example environment 100 for distributing content. The term "content" refers to various types of presented information, such as articles, discussion threads, reports, analyses, financial statements, music, video, graphics, search results, web page listings, information feeds (e.g., RSS feeds), advertisements, and other web-based information. A network 102, such as a local area network (LAN), wide area network (WAN), the Internet, a wired network, a wireless network, or a combination thereof, connects publishers 104, content providers 106, client devices 108, and a content management system (CMS) 110. The environment 100 may connect many thousands of publishers 104, content providers 106, and client devices 108.

Each of the entities 102, 104, 106, 108, and 110 may be implemented or associated with hardware components, software components, firmware components, or any combination of such components. The entities 102, 104, 106, 108, and 110 can, for example, be implemented or associated with general purpose servers, software processes and engines, various embedded systems, or any combination. The entities 102, 104, 106, and 110 may serve, for example, as a content distribution network.

The publishers 104 may include content providers with an Internet presence, such as online publication and news providers (e.g., online newspapers, online magazines, or television websites), online service providers (e.g., financial service providers or health service providers), and other content providers. The publishers 104 may include or maintain one or more data processing systems 114, such as servers or embedded systems, coupled to the network 102. The publishers 104 may include or maintain one or more processes that run on data processing systems. The publishers 104 may include one or more data repositories 124 for storing information.

The publishers 104 may include entities that generate, maintain, provide, present, or process online content and online publications in the environment 100. The term "publication" refers to any data that can be provided by the publisher 104 over the network 102. Publications can include, for example, HTML pages (e.g., web pages), word processing documents, portable document format documents, or RSS feeds. A publication can include content, such as text, images, audio, or video, and may include embedded information, such as meta-information or hyperlinks, and/or embedded instructions, such as markup language (e.g., XML, HTML, etc.), scripts (e.g., JavaScript scripts), or applets. A publisher 104 of a publication may define content item environments, such as content slots, in which supplemental content items can be presented on the publication. These content item environments can be defined in the publication or defined for presentation with the publication.

The content providers 106 may include entities that generate, maintain, provide, present, or process content items. A content item may include graphics, text, images, audio, video, or a combination. A content item may include embedded information, such as embedded media, links, meta-information, machine executable instructions, or a combination. The content providers 106 may include or maintain one or more data processing systems 112, such as servers or embedded systems, coupled to the network 102. The content providers 106 may include or maintain one or more processes that run on one or more data processing systems.

Content providers 106 may be, for example, advertisers that provide or is associated with products or services. The advertisers may include or be associated with, for example, retailers, wholesalers, warehouses, manufacturers, distributors, health care providers, educational establishments, financial establishments, technology providers, energy providers, utility providers, or any other product or service providers or distributors. The advertisers may pay to have content items, such as advertisements, presented to a user of a client device 108. Advertisements may include, for example, commercial promotions, public service announcements, reviews, opinions, or other communications.

As another example, content providers 106 may provide user-generated online content items. Such content items may include images, videos, music, articles, blog posts, social media posts, comments, and discussion threads. As yet another example, content providers 106 may provide content such as search results, information feeds, product listings, television broadcasts, or radio broadcasts.

A client device 108 is an electronic device that is under the control of a user and is capable of requesting and receiving publications and content over the network 102. Example client devices 108 include personal computers, mobile communication devices, and other devices that can send and receive data over the network 102. A client device 108 typically includes a user application, such as a web browser, to facilitate the sending and receiving of data over the network 102. The application can enable a user to display and interact with text, images, videos, music, and other information presented in a publication typically located at a website on the World Wide Web or a local area network. The client device 108 can include various other elements, such as processes running on various machines.

A client device 108 sends a request to a server of a publisher 104. The request may be a request for a publication, such as a web page. The publisher 104 receives the request from the client device 108 and provides or presents the publication to the client device 108. The publisher 104 may provide or present the publication via various mediums and in various forms, including web-based and non-web-based mediums and forms. The publisher 104 may generate and maintain the publication or retrieve the publication from other network resources.

A publisher 104 may be configured to integrate or combine publication content with supplemental content for display to users. In some implementations, supplemental content may be provided from the CMS 110 and be combined with a publication for display to users. A publisher 104 may retrieve a publication for display on a client device 108 and then forward the publication to the client device 108 along with code that causes supplemental content from the CMS 110 to be displayed to the user. In some implementations, a publisher 104 may retrieve a publication, retrieve supplemental content (e.g., from the CMS 110, the content providers 106, or the data repositories 124), and then integrate the publication and the supplemental content for display to the user. In some implementations, the publishers 104 may represent a content network that is associated with the CMS 110, and content providers 106 may present content to users through this content network.

The CMS 110 manages content and provides various services to the publishers 104, the content providers 106, and the client devices 108. The CMS 110 may store content in a data repository 126 and facilitate the distribution and targeting of content through the environment 102 to the client devices 108. The CMS 110 may include one or more data processing systems 116, such as servers or embedded systems, coupled to the network 102. In some implementations, the CMS 110 may include a content serving system 120 and one or more backend systems 118. The content serving system 120 may include one or more data processing systems 116 and may perform functionality associated with delivering content to the publishers 104 or the client devices 108. The backend systems 118 may include one or more data processing systems 116 and may perform functionality associated with identifying content to deliver, generating reports, maintaining accounts and usage information, and other backend system processing and maintenance. The CMS 110 can use the backend processing systems 118 and the content serving system 120 to target content, such as advertisements from advertisers, through the publishers 104 to the client devices 108.

The CMS 110 may include or access one or more crawling, indexing, and searching modules (not shown). The modules may browse and search information from various resources, such as the World Wide Web, publisher content, data feeds, intranets, newsgroups, databases, and/or directories to identify, index, and store information. The search modules may employ one or more known search or other processes to search data. The modules may browse information and create copies of the browsed information for subsequent processing. In some implementations, the modules may index crawled content and/or content received from data feeds to build one or more search indices. The search indices may be used to facilitate rapid retrieval of information relevant to a search query. The modules may check links, validate code, harvest information, and/or perform other maintenance or other tasks.

The CMS 110 may include one or more interface or frontend modules for providing various features to the publishers 104, the content providers 106, and the client devices 108. For example, the CMS 110 may provide one or more publisher front-end interfaces for allowing publishers 104 to interact with the CMS 110. The CMS 110 may provide one or more content provider front-end interfaces for allowing content providers 106 to interact with the CMS 110. In some implementations, the front-end interfaces may be configured as web applications that provide users with network access to features available in the CMS 110.

The front-end interfaces may include or generate physical or virtual mechanisms by which a user (or system) can input information to the CMS 110 and by which a user (or system) can perceive information generated by the CMS 110. In some implementations, the front-end interfaces may include or generate visual interfaces, such as graphical user interfaces (GUIs). Other types of interfaces can be used. The interfaces can include one or more physical or virtual elements or widgets that allow a user (or system) to view, select, or indicate information.

The CMS 110 may provide various features to the publishers 104. The CMS 110 may allow the publishers 104 to search and select specific products and services as well as associated supplemental content to be displayed with content provided by the publishers 104. For example, the publishers 104 may search through content in the data repository 126 and select certain content for display with the publication content. The CMS 110 may deliver supplemental content to the client devices 108 when users access content from the publishers 104. The CMS 110 can be configured to deliver content that is relevant to publisher sites, site content, and publisher audiences. In some examples, the CMS 110 may crawl content provided by the publishers 104 and deliver supplemental content that is relevant to publisher sites, site content, and publisher audiences based on the crawled content.

The CMS 110 may be configured to target content to the client devices 108 directly or through the publishers 104. The CMS 110 may target content to a particular publisher 104 or a requesting client device 108 when a user requests search results or loads content from the publisher 104. The CMS 110 may target content based on user information and behavior, such as particular search queries performed on a search engine website or a geographical location of the user. The CMS 110 may store user-related information (e.g., personal profiles of users, geographic locations of users, content context information) in a general data repository 146. In some examples, the CMS 110 can add search services to a publisher site and deliver content targeted to search results generated by requests from visitors of the publisher site. A combination of these and other approaches can be used to deliver relevant content.

The CMS 110 may display content on a client device 108 using one or more embeddable display elements that allow content to be displayed in a publication. An "embeddable display element" refers to any element that can be embedded in a publication (e.g., a publisher webpage) that allows content from an external source (e.g., the CMS 110) to be displayed in the publication. For example, an embeddable display element may be a content item environment or content slot (e.g., an advertisement slot, a video slot, an image slot, a search result slot, or a web feed slot) for displaying a corresponding content item in the publication.

The CMS 110 may allow the content providers 106 to create content items and input description information associated with a content item. The description information can be used to assist the publishers 104 in selecting content items to display in a publication. The CMS 110 may allow the content providers 106 to input criteria, such as keywords, geographic information, web page identifiers, or display element (e.g., content slot) attributes, for which the content items will appear. Display element attributes may include, for example, location of the display element in the publication (e.g., ATF or BTF), dimensions of the display element, and performance of the display element.

The CMS 110 may calculate actual and predicted performance of a display element in a publication (e.g., a web page, a content page, a document). Performance of a display element may include, for example, a click-through rate associated with the display element, a conversion rate associated with the display element, a probability that content presented in the display element will be viewed by a user, or an amount of time that content presented in the display element will remain visible to a user. The CMS 110 may predict performance of a display element based on an active view scroll distance of the display element with respect to the publication in which the display element is embedded. The active view scroll distance may correspond to a number of pixels that the publication would have to be scrolled downward to change visibility of content presented in the display element from substantially entirely visible, e.g., 100% visible, to less than entirely visible, e.g., 80% visible. The CMS 110 may store performance data for display elements and other information in a performance data repository 136.

The CMS 110 provides various content management features to the content providers 106. For example, the CMS 110 may allow the content providers 106 to set up user accounts, set account preferences, create content, select keywords for content, create campaigns or initiatives for multiple products or businesses, view reports associated with accounts, analyze costs and return on investment, target customers in different regions, target content to particular publishers, target content to particular contexts of online publications, target content to content slots having a particular attribute, track financial information, track content performance, estimate content traffic, access keyword tools, add graphics and animations to content, and other features.

The CMS 110 may allow the content providers 106 to set bids (offer price) for a content item. A bid may represent the maximum amount the content provider 106 is willing to pay for presentation of the content item to a user. The bid may be based on a number of impressions or viewable impressions, click-through rate, viewable impression rate, or other user interaction with the content item. An impression refers to any form of presentation of a content item such that it is displayed to a user. For example, an impression may occur when a content item is displayed by a display device of a client device 108. A viewable impression refers to any form of presentation of a content item such that the content item is viewable to a user. For example, a viewable impression may occur when a certain amount of the content item (e.g., 60% of the content item's surface area) is within a visible area of a browser window on an in-focus web page displayed on a client device 108 for a certain amount of time (e.g., 1 second). A click-through can include any action a user takes to select the content item. Viewable impression rate may refer to a probability that the content item will be viewed by a user. Viewable impression rate can be determined based on, for example, whether the content item was viewed, an amount of time the content item was viewed, or an amount of the content item that was viewed. The content provider 106 may choose a currency and monthly budget.

A bid may be based on performance (e.g., click-through rate or viewable impression rate) of a content slot for which the bid is placed. The CMS 110 may send information about an available content slot to content providers 106 in real time (e.g., in response to receiving a request for content to be presented in the available content slot). The content providers 106 can determine whether and how much to bid for presentation of their content in the available content slot based on an active view scroll distance or performance data associated with the content slot.

The CMS 110 may allow the content providers 106 to view information about the content, which may be maintained by the CMS 110. The CMS 110 may be configured to determine and maintain the number of impressions relative to a particular website, context, or keyword. The CMS 110 may determine and maintain the number of click-throughs for the content as well as the ratio of click-throughs to impressions. The CMS 110 may determine and maintain information specifying viewable impression rate relative to a particular active view scroll distance or content slot location in a publication. The CMS 110 may store impression, click-through, and viewable impression rate data for content items and other information in the performance data repository 136.

The CMS 110 may allow the content providers 106 to select and/or create conversion types for a content item. A "conversion" may occur when a user consummates a transaction related to a given content item. For example, a conversion can be defined to occur when a user clicks on an advertisement, is referred to the advertiser's web page, and consummates a purchase there before leaving that web page. In another example, a conversion can be defined as the display of an advertisement to a user and a corresponding purchase on the advertiser's web page within a predetermined time (e.g., seven days). Other forms of conversion are possible. The content providers 106 may additionally input a cost or a value associated with selected conversion types, such as a five dollar credit to the publishers 104 for each product or service purchased. The CMS 110 may store conversion data for content items and other information in the performance data repository 136.

The CMS 110 may maintain financial accounts for the entities in the environment 100. The CMS 110 may manage and process financial transactions among and between the entities in the environment 100. For example, the CMS 110 may credit accounts associated with the publishers 104 and debit accounts associated with the content providers 106. These and other transactions may be based on conversion data, impressions information, click-through rates, viewable impression rates, content slot performance, or a combination of information received and maintained by the CMS 110.

For purposes of explanation only, certain aspects of this disclosure are described with reference to the discrete elements illustrated in FIG. 1. The number, identity, and arrangement of elements in the environment 100 are not limited to what is shown. For example, the environment 100 can include any number of geographically-dispersed publishers 104, content providers 106, and client devices 108, which may be discrete, integrated modules or distributed systems. Similarly, the environment 100 is not limited to a single CMS 110 and may include any number of integrated or distributed CMS systems or elements.

Furthermore, additional or different elements not shown may be contained in or coupled to the elements shown in FIG. 1, or certain illustrated elements may be absent. In some examples, the functions provided by the illustrated elements can be performed by less than the illustrated number of components or even by a single element. The illustrated elements can be implemented as individual processes run on separate machines or a single process running on a single machine.

Figure 2:
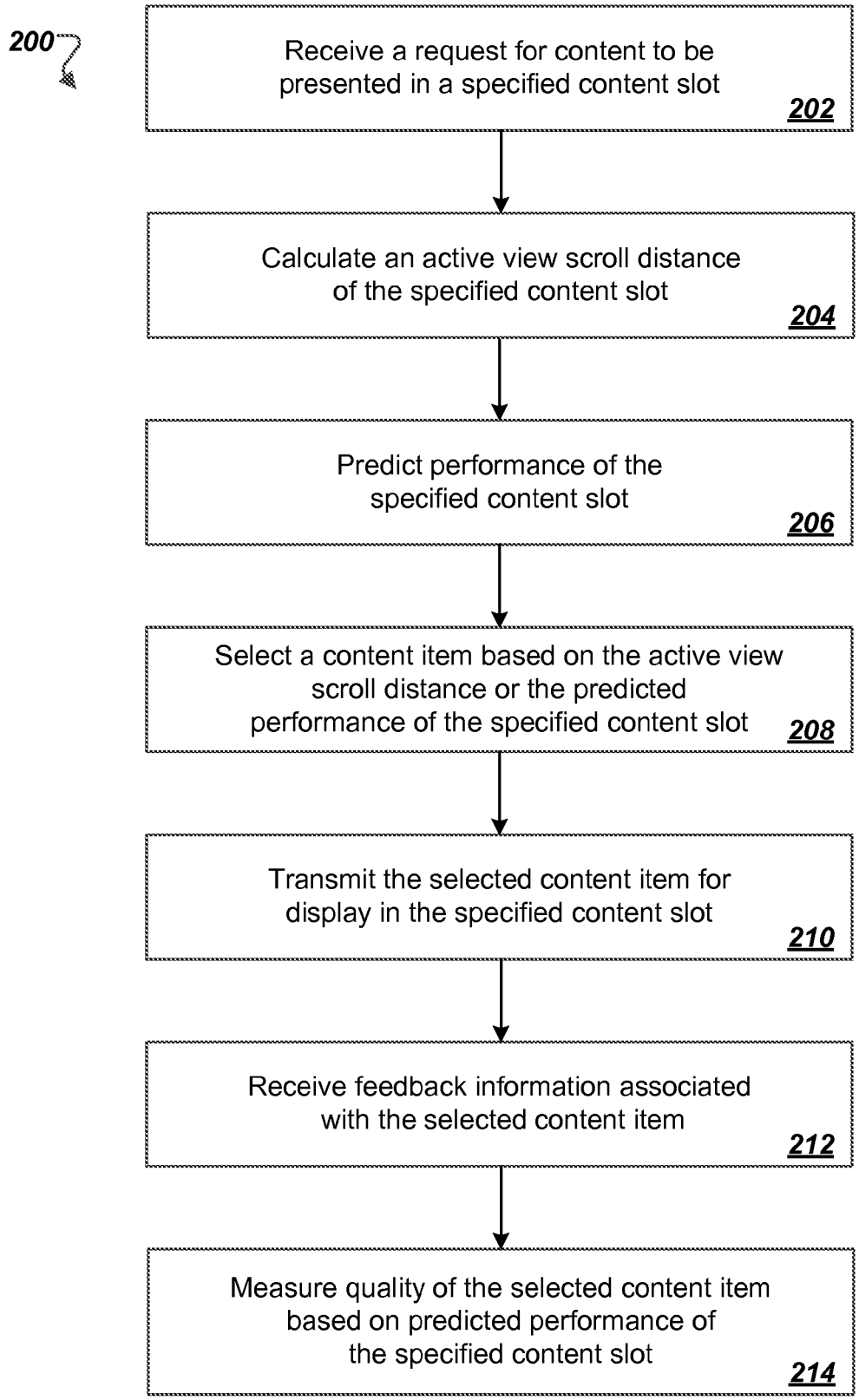
FIG. 2 is a flowchart of an example process for selecting a content item for display in a content slot of a content page based on a predicted performance of the content slot.

FIG. 2 is a flowchart of an example process 200 for selecting a content item for display in a specified content slot of a specified content page based on a predicted performance of the specified content slot. The process 200 may be performed by a content management system (CMS) that includes one or more computers, such as CMS 110 of FIG. 1.

At 202, the CMS receives a request for content to be presented in a specified content slot of a specified content page.

The CMS may receive the request from a client device, a publisher, or a content provider. The request may include information associated with the specified content slot, the specified content page, and a browser that is to display the content page.

In some implementations, the information may include, for example, a location (e.g., coordinates) of the specified content slot on the specified content page, dimensions (e.g., height and width in pixels) of the specified content slot, dimensions (e.g., height and width in pixels) of the specified content page, or dimensions and zoom level of a viewing area of a browser window displaying the specified content page. The information specifying the location of the specified content slot on the specified content page may include a location of the specified content slot relative to locations of other content on the specified content page or an absolute location of the specified content slot on the specified content page.

In some implementations, the information may include an identifier for the specified content slot and an identifier for the specified content page. The CMS may retrieve the specified content page, including the specified content slot embedded in the content page, from a publisher. The CMS may determine a location of the specified content slot on the specified content page, dimensions of the specified content slot, and dimensions of the specified content page based on the content page retrieved from the publisher and the content slot identifier.

At 204, the CMS calculates an active view scroll distance of the specified content slot with respect to the specified content page. The active view scroll distance may correspond to a measurement of a distance, e.g., a number of pixels, that the specified content page would have to be scrolled, e.g., upward, downward, sideward, to change visibility of content displayed in the specified content slot by a specified amount. The specified amount may correspond to a change of the visibility of content displayed in the specified content slot from substantially entirely visible, e.g., 100% of the pixels are visible, to less than entirely visible, e.g., less than 80% of the pixels are visible. The CMS may calculate the active view scroll distance based on a location (absolute or relative) of the specified content slot on the specified content page, dimensions of the specified content slot, dimensions of the specified content page, dimensions and zoom level of a viewing area of a browser window displaying the specified content page, or any combination of the above information.

Figure 3:
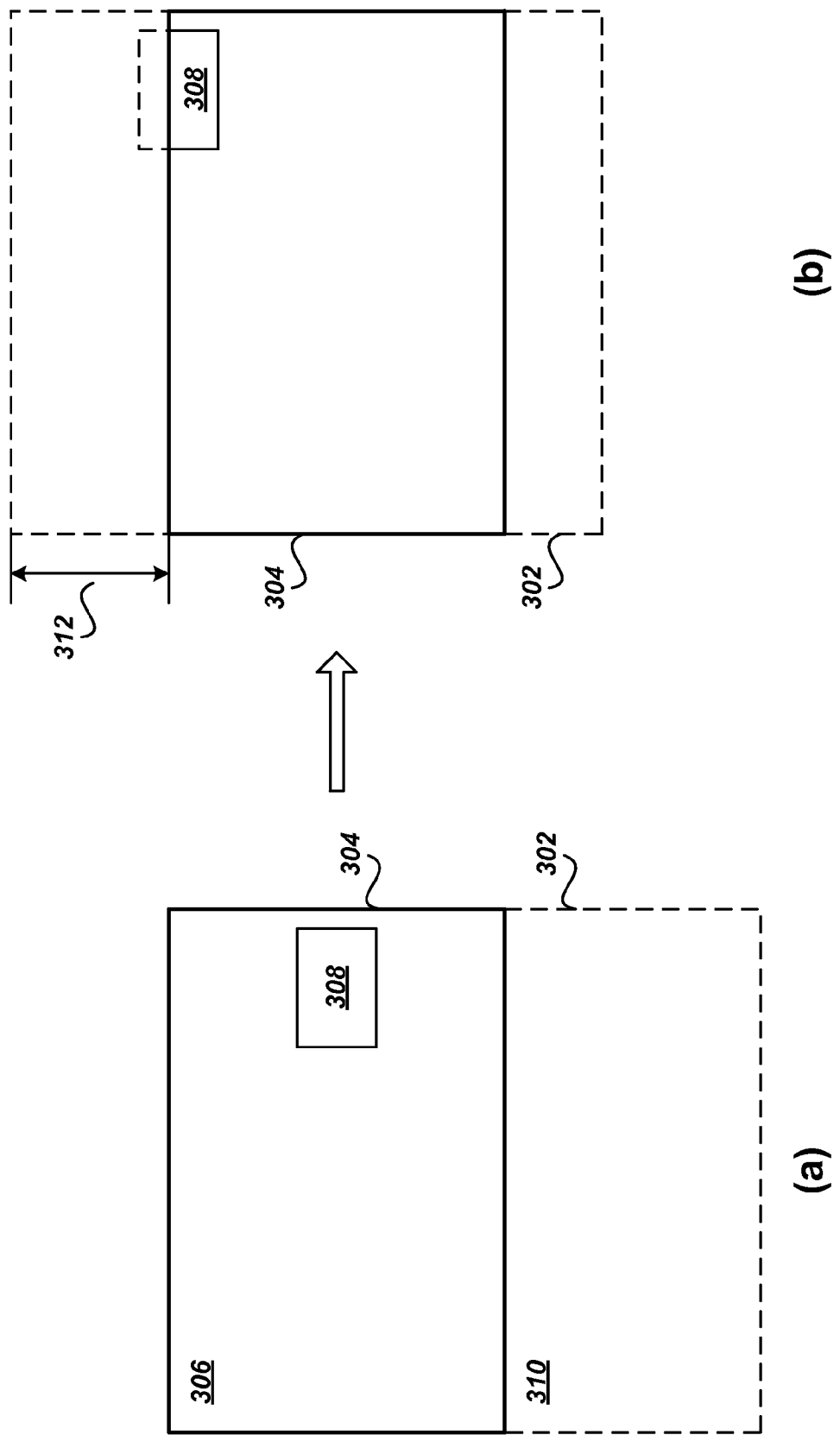
FIG. 3 shows an example of a content page being displayed in a viewing area of a browser window.

FIG. 3 shows an example of a content page 302 being displayed in a viewing area 304 of a browser window at different states (a) and (b). State (a) may correspond to the content page 302 being displayed in a viewing area 304 of the browser window without scrolling. The portion 306 of the content page 302 includes above-the-fold (ATF) content that includes a content slot 308. The portion 310 of the content page 302 includes below-the-fold (BTF) content. State (b) may correspond to the content page 302 after being scrolled downward a number of pixels. In state (b), some of the ATF content has been scrolled out of the viewing area 304 and is not visible in the viewing area 304. Some of the BTF content has been scrolled into the viewing area 304 and is visible in the viewing area 304. The content slot 308 has been partially scrolled out of the viewing area 304 and is less than entirely visible in the viewing area 304. The number of pixels that the content page 302 was scrolled downward to change visibility of content displayed in the content slot 308 from substantially entirely visible to less than entirely visible may be referred to as the active view scroll distance 312.

Referring again to FIG. 2, the CMS predicts performance of the specified content slot based on the calculated active view scroll distance at 206. Predicting performance of the specified content slot may include predicting, for example, a click-through rate or conversion rate of the specified content slot, a probability that content displayed in the specified content slot will be viewed by a user (viewable impression rate), an amount of time that content displayed in the specified content slot will remain visible in a viewing area of a browser window as a user scrolls through the specified content page, or a combination. The CMS may predict performance of the specified content slot based on the calculated active view scroll distance, a location of the specified content slot on the specified content page, dimensions of the specified content slot, dimensions of the specified content page, dimensions and zoom level of a viewing area of a browser window displaying the specified content page, an average scroll speed associated with the specified content page, or other suitable factors or combination of factors.

In some implementations, the CMS may predict performance of the specified content slot by accessing a lookup table that stores active view scroll distances, corresponding actual performance data, and other information associated with content slots. To predict performance of the specified content slot, the CMS may use performance data associated with one or more of the stored active view scroll distances that are closest matched to the calculated active scroll distance of the specified content slot.

In some implementations, the CMS may predict performance of the specified content slot by using a suitable machine learning algorithm. The machine learning algorithm may be trained toward an optimized performance, which may be associated with content slot locations that scroll off content pages relatively slowly as a user scrolls the content pages. Input parameters to the machine learning algorithm may be, for example, the calculated active view scroll distance, a location of the specified content slot on the specified content page, dimensions of the specified content slot, dimensions of the specified content page, dimensions and zoom level of a viewing area of a browser window displaying the specified content page, an average scroll speed associated with the specified content page, or a combination. Based on the input parameters, the machine learning algorithm may provide predicted performance data for the specified content slot.

At 208, the CMS selects a content item based on the active view scroll distance, the predicted performance, or both of the specified content slot. The content item may be, for example, an advertisement, an image, a video, a feed item, or a search result item.

In some implementations, the CMS may select a content item by performing an auction of content items utilizing the active view scroll distance, the predicted performance, or both. To perform the auction, the CMS may provide the active view scroll distance, the predicted performance (e.g., predicted click-through rate, viewable impression rate, or conversion rate), or both to content item providers in real-time bidding calls. The CMS may determine eligibility of content items for the auction based on the active view scroll distance, the predicted performance parameters, or both. For example, if a content slot has a predicted click-through rate of 82%, the CMS may determine that content items that are designated for display in a content slot with a predicted click-through rate of at least 80% are eligible for the auction.

In some implementations, the CMS may select a content item from content items associated with campaigns set up by content item providers. The content item may have been received from a content provider who specified a preferred active view scroll distance or performance of a content slot as one of the criteria for the content item be displayed in the content slot. For example, a content provider can specify that the content item be displayed in a content slot that has a predicted click-through rate of at least 80%. As another example, the content provider can specify that the content item be displayed in a content slot that has a predicted viewable impression rate of at least 60%. Based on active view scroll distance or performance criteria associated with content items, the CMS selects a content item that was previously designated for display in a content slot having an active view scroll distance or a performance corresponding to the calculated active view scroll distance or the predicted performance.

At 210, the CMS transmits the selected content item for display in the specified content slot of the specified content page. In some implementations, the CMS may transmit the selected content item to a client device for display on a display device. In some implementations, the CMS may transmit the selected content item to a publisher who integrates the specified content item into the specified content page for display to users.

After providing the selected content item, the CMS may receive feedback information associated with the selected content item from the client device at 212. The feedback information may include, for example, information specifying whether the selected content item was viewed, an amount of time the selected content item was viewed, an amount of the selected content item that was viewed, or a combination. The information may include click-through and conversion data. The CMS may receive feedback information specifying a scroll speed of the content page in which the selected content item was displayed. The CMS may associate the feedback information with the active view scroll distance of the specified content slot and use the feedback information for subsequent predictions of performance of the specified content slot and other content slots.

The CMS may measure a quality or performance, e.g., click-through rate or viewable impression rates, of the selected content item based on the active view scroll distance, the predicted performance, or both of the specified content slot at 214. The CMS may measure the quality or performance of the selected content item further based on the feedback information received from client devices. The quality or performance of the selected content item may be adjusted or weighted to reflect the predicted performance of the specified content slot. For example, the selected content item may have a click-through rate associated with being displayed in the specified content slot. The click-through rate may be increased if the specified content slot has a low predicted performance. Similarly, the click-through rate may be decreased if the specified content slot has a high predicted performance.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 4:
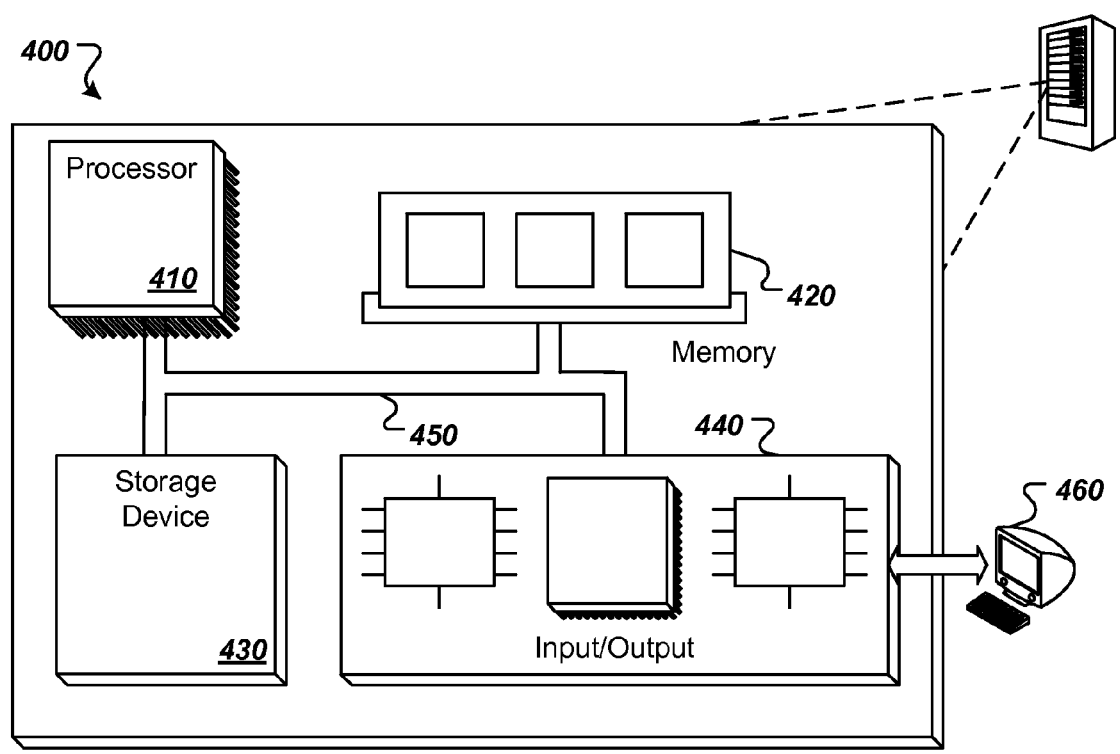
FIG. 4 shows a block diagram of a programmable processing system.

An example of one such type of computer is shown in FIG. 4, which shows a block diagram of a programmable processing system (system). The system 400 that can be utilized to implement the systems and methods described herein. The architecture of the system 400 can, for example, be used to implement a computer client, a computer server, or some other computer device.

The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 460.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can be implemented in combination in a single implementation. Conversely, various features that are described in the context of a single implementation can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method performed by data processing apparatus, the method comprising:
    receiving a request for content to be presented in a content slot that defines a location on a content page;

calculating an active view scroll distance of the content slot relative to the content page based on the location of the content slot on the content page, the active view scroll distance corresponding to a distance that the content page would have to be scrolled to reduce visibility of the content displayed in the content slot by a specified amount, the specified amount at least 20%;

identifying a plurality of candidate content items to provide for display within the content slot;

identifying, for each candidate content item of the plurality of candidate content items, prior performance data identifying, i) for each impression of the candidate content item, a respective active view scroll distance of a respective content slot in which the candidate content item was displayed relative to a respective content page including the respective content slot and ii) a performance metric of the candidate content item for different active view scroll distances identified by the prior performance data;

determining, for each candidate content item, from the different active view scroll distances, an active view scroll distance closest to the calculated active view scroll distance;

determining, for each candidate content item, the performance metric of the candidate content item corresponding to the active view scroll distance closest to the calculated active view scroll distance;

identifying, from the plurality of candidate content items, one or more candidate content items having performance metrics that satisfy a threshold performance value corresponding to the calculated active view scroll distance;

selecting, from the one or more candidate content items, a content item for display in the content slot; and providing, for presentation, the selected content item in response to the request.

2. The method of claim 1, wherein performing the auction comprises:
providing the active view scroll distance to content item providers.

3. The method of claim 1, wherein performing the auction comprises:
predicting performance of the specified content slot based on at least the calculated active view scroll distance.

4. The method of claim 1, wherein the active view scroll distance corresponds to a number of pixels that the specified content page would have to be scrolled downward to change visibility of content displayed in the specified content slot by the specified amount.

5. The method of claim 1, wherein calculating an active view scroll distance of the specified content slot with respect to the specified content page comprises:
calculating the active view scroll distance based on at least one of a location of the specified content slot on the specified content page, dimensions of the specified content slot, dimensions of the specified content page, or dimensions and zoom level of a viewing area of a browser window displaying the specified content page,
wherein the location of the specified content slot on the specified content page comprises either (i) a location of the specified content slot relative to locations of other content on the specified content page, or (ii) an absolute location of the specified content slot on the specified content page.

6. The method of claim 1, wherein predicting performance of the specified content slot based on the calculated active view scroll distance comprises at least one of:
predicting the performance of the specified content slot based on performance statistics associated with active view scroll distances stored in a lookup table; or
predicting the performance using a machine learning algorithm having input parameters that include at least one of the calculated active view scroll distance, a location of the specified content slot on the specified content page, dimensions of the specified content slot, dimensions of the specified content page, dimensions and zoom level of a viewing area of a browser window displaying the specified content page, or an average scroll speed associated with the specified content page.

7. The method of claim 1, wherein predicting performance of the specified content slot based on the calculated active view scroll distance comprises at least one of:
predicting a click-through rate of the specified content slot based on the calculated active view scroll distance;
predicting a probability that content displayed in the specified content slot will be viewed by a user based on the calculated active view scroll distance; or
predicting an amount of time that content displayed in the specified content slot will remain visible in a viewing area of a browser window as a user scrolls through the specified content page.

8. The method of claim 1, further comprising:
receiving feedback information specifying at least one of whether the selected content item was viewed, an amount of time the selected content item was viewed, or an amount of the selected content item that was viewed.

9. The method of claim 1, further comprising:
measuring a quality of the selected content item based on a predicted performance of the specified content slot in which the selected content item is displayed.

10. The method of claim 1, wherein the selected content item comprises an advertisement, an image, a video, a prioritized feed item, or a search result item.

11. A non-transitory computer storage medium encoded with instructions that when executed by a data processing device cause the data processing device to perform operations comprising:
receiving a request for content to be presented in a content slot that defines a location on a content page;
calculating an active view scroll distance of the content slot relative to the content page based on the location of the content slot on the content page, the active view scroll distance corresponding to a distance that the content page would have to be scrolled to reduce visibility of the content displayed in the content slot by a specified amount, the specified amount at least 20%;
identifying a plurality of candidate content items to provide for display within the content slot;
identifying, for each candidate content item of the plurality of candidate content items, prior performance data identifying, i) for each impression of the candidate content item, a respective active view scroll distance of a respective content slot in which the candidate content item was displayed relative to a respective content page including the respective content slot and ii) a performance metric of the candidate content item for different active view scroll distances identified by the prior performance data;
determining, for each candidate content item, from the different active view scroll distances, an active view scroll distance closest to the calculated active view scroll distance;
determining, for each candidate content item, the performance metric of the candidate content item corresponding to the active view scroll distance closest to the calculated active view scroll distance;

identifying, from the plurality of candidate content items, one or more candidate content items having performance metrics that satisfy a threshold performance value corresponding to the calculated active view scroll distance;

selecting, from the one or more candidate content items, a content item for display in the content slot; and providing, for presentation, the selected content item in response to the request.

12. The computer storage medium of claim 11, wherein the active view scroll distance corresponds to a number of pixels that the specified content page would have to be scrolled downward to change visibility of content displayed in the specified content slot by the specified amount.

13. The computer storage medium of claim 11, wherein calculating an active view scroll distance of the specified content slot with respect to the specified content page comprises:

calculating the active view scroll distance based on at least one of a location of the specified content slot on the specified content page, dimensions of the specified content slot, dimensions of the specified content page, or dimensions and zoom level of a viewing area of a browser window displaying the specified content page, wherein the location of the specified content slot on the specified content page comprises either (i) a location of the specified content slot relative to locations of other content on the specified content page, or (ii) an absolute location of the specified content slot on the specified content page.

14. The computer storage medium of claim 11, wherein predicting performance of the specified content slot based on the calculated active view scroll distance comprises at least one of:

predicting the performance of the specified content slot based on performance statistics associated with active view scroll distances stored in a lookup table; or predicting the performance using a machine learning algorithm having input parameters that include at least one of the calculated active view scroll distance, a location of the specified content slot on the specified content page, dimensions of the specified content slot, dimensions of the specified content page, dimensions and zoom level of a viewing area of a browser window displaying the specified content page, or an average scroll speed associated with the specified content page.

15. The computer storage medium of claim 11, wherein predicting performance of the specified content slot based on the calculated active view scroll distance comprises at least one of:

predicting a click-through rate of the specified content slot based on the calculated active view scroll distance;

predicting a probability that content displayed in the specified content slot will be viewed by a user based on the calculated active view scroll distance; or predicting an amount of time that content displayed in the specified content slot will remain visible in a viewing area of a browser window as a user scrolls through the specified content page.

16. The computer storage medium of claim 11, further comprising:

receiving feedback information specifying at least one of whether the selected content item was viewed, an amount of time the selected content item was viewed, or an amount of the selected content item that was viewed.

17. The computer storage medium of claim 11, further comprising:

measuring a quality of the selected content item based on a predicted performance of the specified content slot in which the selected content item is displayed.

18. The computer storage medium of claim 11, wherein the selected content item comprises an advertisement, an image, a video, a prioritized feed item, or a search result item.

19. A system, comprising:

a data processing apparatus; and a non-transitory computer storage medium encoded with instructions that when executed by the data processing apparatus cause the data processing apparatus to perform operations comprising:

receiving a request for content to be presented in a content slot that defines a location on a content page;

calculating an active view scroll distance of the content slot relative to the content page based on the location of the content slot on the content page, the active view scroll distance corresponding to a distance that the content page would have to be scrolled to reduce visibility of the content displayed in the content slot by a specified amount, the specified amount at least about 20%;

identifying a plurality of candidate content items to provide for display within the content slot;

identifying, for each candidate content item of the plurality of candidate content items, prior performance data identifying, i) for each impression of the candidate content item, a respective active view scroll distance of a respective content slot in which the candidate content item was displayed relative to a respective content page including the respective content slot and ii) a performance metric of the candidate content item for different active view scroll distances identified by the prior performance data;

determining, for each candidate content item, from the different active view scroll distances, an active view scroll distance closest to the calculated active view scroll distance;

determining, for each candidate content item, the performance metric of the candidate content item corresponding to the active view scroll distance closest to the calculated active view scroll distance;

identifying, from the plurality of candidate content items, one or more candidate content items having performance metrics that satisfy a threshold performance value corresponding to the calculated active view scroll distance;

selecting, from the one or more candidate content items, a content item for display in the content slot; and providing, for presentation, the selected content item in response to the request.

* * * * *